Dec. 31, 1968    C. BROOKS ET AL    3,419,458
DECORATIVE EXTRUDED PLASTIC STRIPPING AND
LAMINATED PRODUCTS INCLUDING THE SAME
Filed May 7, 1964
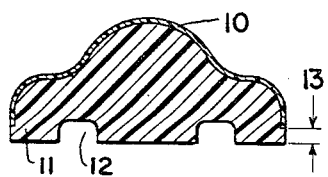
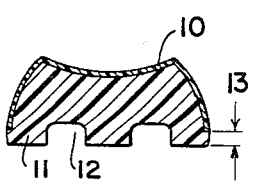
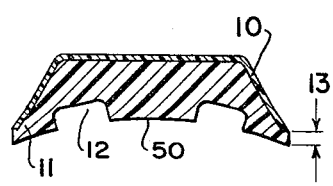
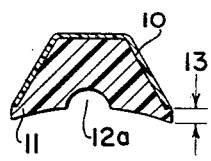
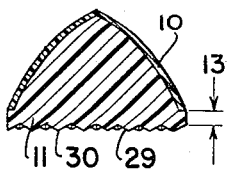
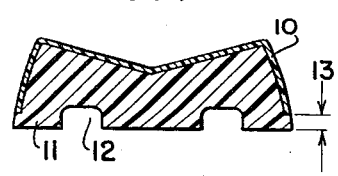
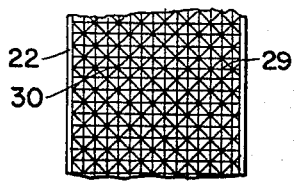
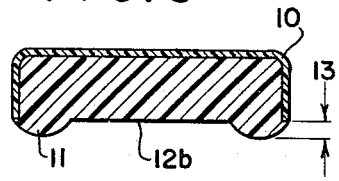
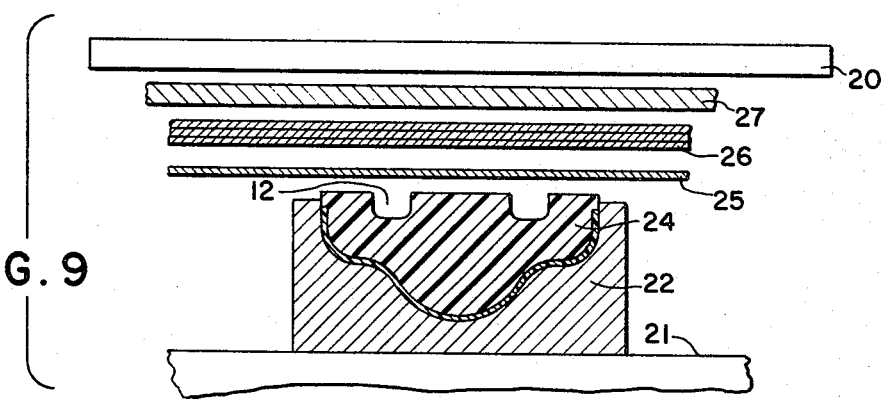
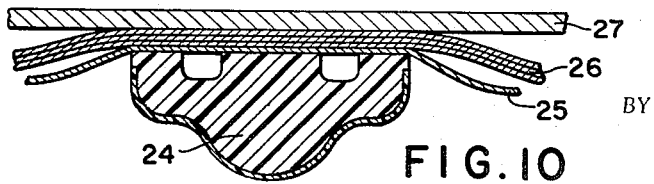
INVENTOR.
CHARLES BROOKS
THOMAS SUTTON
BY
ATTORNEY

United States Patent Office 3,419,458
Patented Dec. 31, 1968

3,419,458
DECORATIVE EXTRUDED PLASTIC STRIPPING AND LAMINATED PRODUCTS INCLUDING THE SAME
Charles Brooks and Thomas Sutton, Brooklyn, N.Y., assignors to Cee Bee Mfg. Co., Inc., Brooklyn, N.Y., a corporation of New York
Filed May 7, 1964, Ser. No. 365,840
4 Claims. (Cl. 161—121)

ABSTRACT OF THE DISCLOSURE

The disclosure describes extruded plastic stripping for decorative application purposes having a reinforcing cover which will terminate short of the bottom of the side walls with the die enclosing said strip having its edges extending beyond the edges of the cover, but terminating short of the bottom of the strip. The bottom of the strip is provided with longitudinal recesses or valleys or grooves which receive any excess molten material resulting from said attachment. As a result, a more secure attachment is obtained and flashing is prevented.

---

The present invention relates to an extruded plastic stripping and it also relates to the use of such extruded plastic stripping for decorative purposes and particularly in connection with the preparation of various types of panels upon which said stripping may be applied for decorative purposes.

Although not limited thereto, the present invention may be most satisfactorily employed in connection with its application to door panels or other panels, such as are used in automobiles, on motor boats, in the home and in various cabinets.

However, the basic invention may also be applied to both exterior and interior automotive and other trim and in general for edging or trimming panels for use in or around the home or office or in connection with various types of cabinets for radio and television, air conditioning equipment, electrical refrigerators and for walls.

Although the present invention will be particularly described in its application to vinyl polymers and particularly polyvinyl chloride polymers, it has a broad field of application to various extruded resins such as polyethylene, polypropylene, polystyrene, polyvinyl acetate and acrylonitrile tributylstyrene, known commercially as ABS.

It is among the objects of the present invention to provide an improved and novel extruded plastic stripping of the chartacter described and the use thereof for decoration of laminated panels, particularly where the stripping is applied to the panel at the same time as the panel is being manufactured.

A particularly important object of the present invention is to provide for lateral compression as well as for effective sealing of extruded plastic strips upon decorative panels or rigid or compressible fabric so that there will be no tendency toward flash or spreading of the vinyl decorative trim as a result of dielectric or other types of adhesion.

Although the attachment is desirably made by dielectric sealing to the panel structure, which dielectric sealing may also be used for joinder of the laminations of the panel, it is to be understood that other methods of joinder may be employed.

Such alternate methods of joinder may include the use of solvent based adhesives or the use of 100% reactive, polymeric adhesives.

Another object is to provide an improved type of decorative extruded plastic stripping which is readily attached to flat structures and which will not be subject to spreading or defacement upon attachment to the base structure as a result of the dielectric adhesion or other processes which may result in a tendency of the plastic polymer or adherent to flow from under the stripping to the side.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory to extrude the polyvinyl chloride or other plastic polymer at a temperature of 350–450° F. and then to apply to the exposed face thereof a thin covering of Mylar or polyethylene terephthalate.

Desirably, the underface of this Mylar may be coated with aluminum vapors in a vacuum to enhance the adhesion thereof and it may additionally be coated with an adhesive of the same nature of the extruded plastic.

For example, the adhesive may be a combination of polyvinyl chloride or acetate together with a small amount of butadiene. If desired, it is also possible to apply a clear vinyl polymer over the Mylar either by extrusion or by applying an additional strip over the covering of the Mylar and this vinyl material may carry corrugations or embossings to give an extra decorative effect.

Desirably, we may effect extrusion of the base polymer and after combination with the Mylar covering the combined material is quickly cooled in cold water to a temperature of 85 to 125° F. This decorative stripping which may be made in a wide variety of forms and shapes is desirably provided with one or more bottom channels or recesses or pockets which will serve to take up any excess plastic from the bottom face during the dielectric or other attachment procedure.

In the preferred form of the invention the covering strip of polyethylene terephthalate desirably does not extend to the bottom face of the extruded plastic strip and there is left a space of between .01 to .04 inch or desirably .015 to .030 inch which will keep the Mylar from contacting the surface to which the strip is applied and this excess extruded plastic material below the edges of the Mylar cover may then be taken up or received in the internal pockets, channels or recesses.

In connection with the formation of panels as, for example, for automobiles, the base material may consist of a plurality of layers of materials which will be impregnated or coated with vinyl latex or other heat reactivated adhesive so that upon dielectric heating they will be sealed together.

The base material upon which the stripping is attached by way of dielectric sealing is desirably formed of a panel of wood or fiberboard with a layer of padding of hair felt or vinyl foam or scrap fiber, bonded together with vinyl latex and having over its top face a vinyl film to which the decorative or Mylar-covered stripping of the present invention is then applied by means of dielectric heating operations in which a radio frequency of the nature of 20 to 70 kilocycles or preferably of 40 to 50 kilocycles is applied.

In the dielectric sealing it is desirable to apply pressure to the edges of the strip so as to force the molten or fluid plastic interiorly of the bottom face upon adhesive attachment and then the product is permitted to cool after the combination has been formed.

Although continuous grooves may be employed for receiving any excess of molten extruded plastic a series of pockets separated from one another may also be employed for this purpose and if desired the entire bottom face of the plastic strip may be slightly concave so that there will be an enhanced flow toward the center of the strip.

It has been found that vinyl stripping composed of a plastic extrusion of a vinyl chloride or vinyl acetate polymer may be most readily subjected to attachment and mounting upon various types of sheet materials as a decorative trim.

According to the preferred form of the invention, it is desirable to provide the maximum thickness away from one or both edges of the strip and to provide the strip so that it will have its maximum thickness at or adjacent the point of recessing with one or both of the side edges being somewhat thinner.

In the preferred form of the present invention the amount of recessing at the bottom face of the strip may constitute between 5 to 20% of the total cross-section and this will permit sufficient flow area for any molten plastic to assure a close bond onto the surface to which the material may be applied without spreading to the side.

Desirably, the polyvinyl strip is also free at its edges so that the Mylar cover will be spaced .020 to .040 inch at its edge from the edge of the strip.

Upon sealing by dielectric means, the edges of the cover will not be distorted by the flow of the thermoplastically softened polymer or other adherent.

It has further been found most satisfactory to utilize this system of lamination in combination with a bottom convexly curved vinyl plastic sheet or strip or recessed bottom.

A particularly satisfactory method of applying the metal encased reenforcement is between marginal edges with the reenforcement terminating short of the marginal edges and being applied to a convex surface or to a beaded surface having bottom recesses.

The most satisfactory type of vinyl plastic is one which is composed of a polymerized polyvinyl chloride preferably in plasticized and stabilized condition.

It has been found that when this material is extruded and while in hot plastic condition, it may be combined under pressure with thin metallized Mylar sheets so that a highly permanent union is formed which will be rendered quite inseparable if the product is subjected to quick cooling as by immersing in cold water.

It has been found that if this metallized application is less than one-tenth mil in thickness and desirably in the range of one hundredth to one-thousandth mil, the metal is of sufficient thickness to give the greatly enhanced wetting and unification characteristics, while not of sufficient thickness to disadvantageously affect the pliability or flexibility of the vinyl strip or sheet. The polyester film which has been metallized is then coated as by roller coating with a thin adhesive film of the same type of plastic as the base material to be reenforced. This adhesive may be polyvinyl chloride containing butadiene or polyvinyl acetate containing butadiene.

However, the plasticizers should be present in greater proportion in the polyvinyl chloride adhesive film than in the base sheet or strip. Desirably the plasticizers in the adhesive strip should be one and one-half to two times the percentage weight of those in the base strip or extruded vinyl plastic.

Where an alkyl phthalate or alkyl fatty acid ester is used as a plasticizer, the proportion in an adhesive coating should always be greater than the proportion in the base material.

With the foregoing and other objects in view, the invention consists of the novel construction, combination and arrangement of parts as hereinafter will be more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIGURES 1 to 5 are transverse sectional views of various types of stripping which may be utilized for forming the decorative trim effect of the present invention.

FIG. 6 is a bottom plan view of the cross-section of FIG. 5.

FIGS. 7 and 8 are transverse sectional views of alternative types and shapes of stripping in accordance with the present invention.

FIG. 9 is a diagrammatic transverse sectional view of a partial layup of the parts of a decorative panel as they are positioned in a laminating machine.

FIG. 10 is a fragmentary transverse sectional view through a finished decorative panel which has been formed from the parts as shown in FIG. 9.

Referring to FIGS. 1, 2, 3, 4, 5, 7 and 8, there is shown a base extrusion 11 having a Mylar cover 10 which is metallized on its lower surface and may also be coated on its under face with an adhesive material. The Mylar may be relatively thin and have a thickness varying from ¼ to 1 mil or sometimes 1 to 3 mils and there is desirably always a space of between .020 and .040 inch between the bottom face of the extruded polymer strip and the edge of the Mylar film, these spaces being indicated at 13.

The bottom faces of the strips may be concaved upwardly (as shown at 50 in FIG. 3) and provided with recesses 12. These recesses 12 may be continuous channels or spaced recesses and serve as receptors for excess molten vinyl or other adherent which results from the joining process, preventing flashing.

An alternative method of providing receptors for the excess material is shown in FIGS. 5 and 6. In this case the bottom surface 29 of the extruded strip is formed into a number of minute pockets or receptacles 30 formed by the intersection of parallel series of ridges and valleys embossed in the strip as in a coarse knurling pattern.

The size and proportion of the recesses 12 and 30 may be changed over a wide range but in general will represent from 5 to 20% of the total cross sectional area of the strip. On a small section as in FIG. 4 it may be desirable to have only one groove 12a. On a wide but thin section as shown in FIG. 8 a single wide shallow groove 12b may be preferred.

In the application of these strips the parts must be fitted into a closely fitted and contoured die. Another function of these grooves or recesses 12 is to provide added longitudinal elasticity or compressibility to these strips so as to facilitate their entry into the dies. Since this secondary function is served by the grooves but not by the knurled pockets, the grooves 12 are the preferred form when this function is desired.

In FIG. 9 is shown, diagrammatically, a partial layup of a decorative panel in the laminating machine. In this figure it refers to the upper, movable platen or electrode 20 of the dielectric laminating machine which cooperates with the lower electrode holder or platen 21. The electrode proper has its internal contour shaped to fit the contour of the strip 24. The electrodes extend in length and shape to conform to the pattern desired in the finished laminate. In operation, the decorative strip 24 is first placed in the electrode 22. Over this is placed a strip or strips of vinyl or vinyl coated material 25 which will form the major portion of the finished panel surfaces. On top of this is placed a layer of resilient foamed or fibrous material 26 which is used when a cushioned or padded panel is desired.

Finally the base panel 27 of hardboard or other suitable material having an adhesive coating thereon is placed over the assembly and the upper platen 20 is lowered.

The platen 20 is lowered by a mechanical or hydraulic or pneumatic device (not shown) capable of applying a pressure of 5 to 500 pounds per square inch over the entire sealing area.

The dielectric field is then applied to heat and soften the materials being laminated, for from 5–30 seconds and then there is a cooling period of similar duration before the press is opened.

FIG. 10 shows a partial cross section through a finished decorative panel. The hardboard 27 now has bonded to its surface the top surface of the resilient layer 26. This layer has been compressed to a fraction of its initial thickness and is in turn bonded to the inner surface of the finishing vinyl fabric 25.

The decorative strip 24 is bonded to the surface of the vinyl fabric 25. The effect of the dielectrically induced heat and the mechanical pressure has been to soften the polymeric materials comprising a portion of the body or at least the surface coatings of all the layers of the final laminate and to cause them to flow and coalesce into a more or less unitary end product.

Since mechanical bonding of all the layers requires good thermoplastic flow some of this flow may be in undesired directions unless proper provision is made.

For instance if the strip 24 were a solid strip the softened material might flow out or flash out of the channel formed in the die 22 and would form an unsightly ridge along the side of the strip after removal from the die. By providing the grooves or recesses 12, space is provided for the flow of this molten material inwardly where it can aid in bonding and not mar the apperance of a finished panel.

The Mylar cover 10 may be surfaced on or metallized on its under face with aluminum vapors and also coated with an adhesive material comprised of vinyl chloride or vinyl acetate containing butadiene. The Mylar may be relatively thin and have a thickness varying from ¼ to 1 mil or sometimes 1 to 3 mils and there is desirably always a space 13 between .020 and .040 inch between the bottom face of the strip 11 and the edge of the Mylar film 10 as indicated at 13.

Other than dielectric sealing procedures may be employed such as by means of organic solvents including xylol, acetone or tetrachlorethane.

The material 25 may be vinyl coated or impregnated grained or embossed cloth or fabric material which may be 10 to 16 gauge or be as much as 30 gauge.

The material 26 may consist of cellulose or fibrous padding or rubber foam or polyurethane foam which may also be formed of a hair filled material.

This padding 26 may be 1/16 to ⅛ inch thick or even ¼ inch thick. The board or rigid material 27 may be vinyl impregnated or vinyl coated and it may be made or formed of wood pulp or fiber or consist of a pressboard or consolidated fibrous material which is about ⅛ to ¼ inch thick and may be vinyl or plastic impregnated or covered with a vinyl or plastic latex coating.

The pressure during consolidation may vary from 3 to 10 pounds per square inch and the temperature may vary from 300 to 380° F. and there desirably is a dielectric heating application of about 10 to 30 seconds followed by a cooling period of 20 to 30 seconds.

The best results are obtained with the polyvinyl plastic containing about thirty to sixty percent of a plasticizer, such as dioctyl phthalate, or diisooctyl phthalate or dioctyl azelate, one to two percent of barium, cadmium, tin and/or lead stearate and two to five percent of a stabilizer such as tin, barium, cadmium or zinc mercaptide is extruded at a temperature of about three hundred to four hundred fifty degrees Faherenheit.

The present invention is particularly applicable to automotive trim applied both to the interior as well as the exterior of an automotive body or to motor boats. However, it may be used in general for edging or trimming various types of appliances such as electric refrigerators, kitchen cabinets, sewing machines, conditioning equipment, television and radio cabinets, and for wall moldings, junctions and strippings.

The grooves or recesses 12 should project slightly above the lower edges of the Mylar covering 16 to 21. At the same time the spacing 13 should not exceed about 1/32 to 1/16 of an inch and is desirably in the range of .02 to .04 inch.

The preferred cover polyester film material referred to by its trademark Mylar is made from polyethylene terephthalate which is a polymer formed by a condensation reaction between ethylene glycol and terephthalic acids.

Although the present invention has a particular application to flexible polymerized polyvinyl chloride it also has a broad application to rigid plastic, such as rigid vinyl polymers, polyethylene and also to a lesser degree to extruded cellulose acetate and butyrate.

While there has ben described herein a preferred form of the invention, it should be understood that the same may be altered in details and in relative arrangement of parts within the scope of the appended claims.

Having now particularly described and ascertained the nature of the invention, and in what manner the same is to be performed:

What is claimed is:

1. A decorative extruded narrow vinyl chloride polymer strip for dielectric sealing to a flat supporting base sheet, said strip having a flat bottom, an elevated convexly outwardly curved top central portion of maximum thickness, sidewardly and downwardly sloping curved side portions of much lesser thickness than the central portion, and unrecessed vertical sides perpendicular to said flat bottom and terminating at said flat bottom, a thin conductive metallized conducting polyethylene terephthalate cover strip covering and laminated to said central elevated curved top central portion and said sidewardly and downwardly sloping side portions and the upper part of said vertical sides, and extending vertically along the upper part of said vertical sides and terminating well above the flat bottom on said sides so that the metallized covering strip will not contact the flat base sheet upon dielectric sealing, a pair of inwardly extending longitudinal deep channels with vertical side walls projecting perpendicularly upwardly into the body of the strip from the flat bottom on each side of said central elevated portion and in the area of said sloping side portions to above the lower edges of said cover strip and having sufficient capacity to receive the amount of polymer below the lower edges upon dielectric sealing, said channels constituting from 5 to 20% of the total cross-sectional area.

2. The decorative extruded strip of claim 1, the spacing between the bottom and the lower edges of the covering strip being between .01 to .04 inch to kep the protective covering strip from contacting the base sheet to which the strip is dielectrically sealed.

3. The decorative extruded strip of claim 1, said thin protective cover strip being under-coated with aluminum and carrying an adhesive underface.

4. A method of applying the polymer strip of claim 1 to a board having a flat supporting base sheet composed of a vinyl film which comprises embodying the polymer strip in a recessed die, the edges of which will project beyond the edges of the cover strip but stopping short of the flat bottom and then applying a dielectric sealing operation at a frequency of 20 to 70 kilocycles.

References Cited
UNITED STATES PATENTS

| | | | |
|---|---|---|---|
| 3,013,919 | 12/1961 | Bialy | 156—244 |
| 3,024,147 | 3/1962 | Brooks et al. | 156—244 X |
| 3,075,862 | 1/1963 | Hoyer | 156—273 X |
| 3,085,294 | 4/1963 | Rosenbaum | 156—272 |
| 3,018,189 | 1/1962 | Traver | 156—272 |

MORRIS SUSSMAN, *Primary Examiner.*

U.S. Cl. X.R.

156—273; 161—123